United States Patent [19]

Rivalto

[11] Patent Number: 5,482,139
[45] Date of Patent: Jan. 9, 1996

[54] AUTOMATED DRIVE-UP VENDING FACILITY

[75] Inventor: Michael A. Rivalto, Memphis, Tenn.

[73] Assignee: M.A. Rivalto Inc., Memphis, Tenn.

[21] Appl. No.: 389,319

[22] Filed: Feb. 16, 1995

[51] Int. Cl.⁶ ..................................................... E04H 3/02
[52] U.S. Cl. ............................ 186/36; 186/53; 235/383
[58] Field of Search .................................. 186/35, 36, 37, 186/41, 49, 52, 53, 55, 56, 57, 69; 235/383

[56] References Cited

U.S. PATENT DOCUMENTS

| | | | |
|---|---|---|---|
| 3,647,026 | 3/1972 | Alexander et al. | 186/1 C |
| 4,073,368 | 2/1978 | Mustapick | 186/1 C |
| 4,111,282 | 9/1978 | Vayda, Jr. | 186/36 |
| 4,169,521 | 10/1979 | Vayda, Jr. | 186/36 |
| 4,311,211 | 1/1982 | Benjamin et al. | 186/53 |
| 4,638,312 | 1/1987 | Quinn et al. | 186/53 X |
| 4,675,515 | 6/1987 | Lucero | 186/41 X |
| 4,803,348 | 2/1989 | Lohrey et al. | 235/383 X |
| 4,805,738 | 2/1989 | Vayda | 186/36 |
| 5,003,505 | 3/1991 | McClelland | 364/900 |
| 5,016,736 | 5/1991 | Vayda | 186/53 |
| 5,052,519 | 10/1991 | Woodham | 186/53 X |
| 5,113,974 | 5/1992 | Vayda | 186/53 X |
| 5,128,862 | 7/1992 | Mueller | 364/405 |
| 5,158,155 | 10/1992 | Domain et al. | 186/53 |
| 5,235,509 | 8/1993 | Mueller et al. | 364/405 |
| 5,271,703 | 12/1993 | Lindqvist et al. | 186/55 X |
| 5,401,946 | 3/1995 | Weinblatt | 235/383 X |

FOREIGN PATENT DOCUMENTS

| | | | |
|---|---|---|---|
| 4134872 | 4/1993 | Germany | 186/55 |
| 4199498 | 7/1992 | Japan | 235/383 |

Primary Examiner—Michael S. Huppert
Assistant Examiner—Scott L. Lowe
Attorney, Agent, or Firm—Lyman R. Lyon

[57] ABSTRACT

An automated drive-up vending facility (10) and method utilizes a plurality of automatic transaction machines (12) located around the periphery of a storage building (14), whereby customers can drive their vehicles along side the building, insert an account/debit card into a card reader (16), and make product selections via a touch screen display terminal (18). The products are stocked within building (14), and an automated picking/sorting subsystem (20) retrieves the selected products for deposit into a dispensing chute (22). Selection and product information is provided at the display terminals (18) via an interactive menu driven program. Selection of products subject to sales restrictions automatically actives video conferencing equipment (26) so that a sales attendant can confirm customer authorization to purchase the selected product. Customer purchasing history is stored and analyzed to improve a product's chances of promotional marketing influencing a customer's product selection prior to the completion of a vending transaction.

20 Claims, 5 Drawing Sheets

Choose an Aisle:

Grocery Aisles Area

| Dairy Products | Cold Beverages |
|---|---|
| Bakery/Deli | Cookies/Crackers |
| Baby Food/Care | Cereal/Rice/Pasta |
| Dry Beverages | Condiments |
| Gum/Candy | Nuts/Chips/Dips |
| Canned Goods | Other Grocery |

Pharmacy

- Cough/Cold
- Pain/Relief
- Digestive Relief
- Skin Care
- Male/Female
- Other Pharmacy

Other

- Supplements
- Kitchen/Laundry
- Toiletries
- Pantyhose
- Tobacco
- Pet/Photo/Other Total price for all of the Shopping Cart's current contents, including sales tax:

000.00

Quit—No Purchases

FIG. 5

AUTOMATED DRIVE-UP VENDING FACILITY

BACKGROUND OF THE INVENTION

The present invention generally relates to drive-up retail facilities for vending and/or distributing a multitude of consumer products, and more specifically, to a drive-up retail facility having improved automation capabilities.

Generally speaking, presently known vending/distribution facilities fundamentally operate on human interaction. Such vending distribution facilities suffer the drawback that the need for human interaction creates a significant inconvenience for potential customers. More specifically, potential customers/vendees must physically browse through a particular retail facility where goods may then be purchased from an attendant/cashier. Thus, customers are burdened by the amount of time and expense involved in shopping in the retail facility and waiting for service.

Several attempts have been made to overcome these drawbacks. For example, U.S. Pat. No. 5,158,155 to Domain et al discloses a vendors' complex formed from a central warehouse facility, several customer order stations interconnected with the warehouse facility, several customer pick-up stations interconnected with the warehouse facility, and a network of vehicle routing lanes extending through the warehouse facility and passing by the customer order stations and pick-up stations. Customers using the Complex are directed along the routing lanes to an order station where they place orders for goods and/or services provided by the vendors housed in the Vendors' Complex. The customers are then directed to drive to a particular pick-up station where they receive their ordered goods. The central warehouse facility provides a means of storing consumer goods, preparing goods, and performing services for customers of the Vendors' Complex.

U.S. Pat. No. 4,805,738 to Vayda, discloses a single stop shopping facility formed from a plurality of customer stations, each including a vehicle parking space, which are arranged around the exterior of a circular building containing goods for sale, The customer stations and building rotate relative to one another. The building includes a loading station for delivering selected goods ordered at the customer stations. The walls of the building support merchandise display sections which are viewable by persons located at the customer stations, the displays being cyclically exposed to the parked vehicles as a result of the relative rotation, permitting the selection and payment for merchandise as the relative rotation continues. After a lapse of a predetermined time interval, the rotation of the customer station positions the loading station adjacent to the vehicle from which merchandise was ordered.

U.S. Pat. No. 4,073,368 to Mustapick discloses an automated merchandising system where customers may drive their automobiles into a parking area and order desired goods, pay for and receive the goods while remaining in their automobiles. A goods storage building is located remotely from and electronically interconnected with the parking area. At the parking area a plurality of automobile receiving locations are provided each with a communicator equipped with video means for viewing goods available at the remote building and with keyboard and voice means for transmitting to said remote building a goods order. Goods so ordered are assembled, tabulated and delivered by order clerks or automated picking equipment.

U.S. Pat. No. 3,647,026 to Alexander et al discloses an automatic drive-in store structure having in its upper portion a warehouse for storing a multiplicity of diverse retail items within individual dispenser units, and in its lower portion a plurality of parking stalls for vehicles, each stall being provided with a console control apparatus which is equipped with a plurality of item selector panels for use by a motorist. Retail items may be ordered and then dispensed from the respective dispenser unit responsive to an electronic control means and delivered through a system of conveyors to the automobile. The console control apparatus is provided with a closed circuit television which is in circuit with a video camera for transmitting a picture of a selected item onto a television screen, and a moneychanger unit which returns the correct change after registering the amount submitted and subtracting the total price of the items selected.

While each of the above-noted patents describe vending facilities which provide a certain degree of automated shopping for a customer, a need still exists for a vending facility which provides a more efficient and automated system, while easily integrating and accommodating additional customer services, such as disseminating prepurchase product and/or sales information.

SUMMARY OF THE INVENTION

It is therefore an object of the present invention to provide an improved automated vending facility which can allow all sales transactions to be completely performed without a customer leaving their vehicle.

It is another object of the present invention to provide an automated vending facility having automatic customer identification capabilities when a customer selects goods which are subject to sales restrictions.

It is another object of the present invention to provide an automated vending facility having an improved goods order input/retrieval system and integrated inventory management capabilities.

It is yet another object of the present invention to provide an automated vending system having improved product promotional marketing capabilities.

It is yet another object of the present invention to provide an automated winding facility which can be integrated with an automated banking system, and an automated vehicle refueling system.

In accordance with the present invention, an automated vending facility and system comprises a storage facility for housing a plurality of saleable goods, wherein the sale of at least some of the plurality of saleable goods may be subject to particular sales restrictions, at least one customer input means positioned outside of the storage facility which is accessible to an occupant of a vehicle when the vehicle is positioned adjacent to the at least one input means, and an automated goods retrieval means located within the storage facility which is responsive to the at least one customer input means for retrieving any goods which are selected for purchase by a customer. A goods dispensing means delivers the goods retrieved by the retrieval means to the customer. In addition, a purchase authorization means is provided having means for detecting customer selection of one of the goods subject to sales restrictions, means responsive to the detection means for automatically providing direct communication between the customer and an authorization/sales attendant, means for communicating customer identification information to the authorization attendant, and means remotely operated by the authorization attendant for enabling completion of the restricted goods sales transaction upon attendant verification of acceptable customer identification information.

In accordance with a another aspect of the present invention, an automated drive-up vending system comprises a storage facility for housing a plurality of saleable goods may be subject to particular sales restrictions, at least one customer input means positioned outside of the storage facility which is accessible to an occupant of a vehicle when the vehicle is positioned adjacent to the at least one input means, and an automated goods retrieval means located within the storage facility which is responsive to the at least one customer input means for retrieving any goods which are selected for purchase by a customer. A goods dispensing means delivers the goods retrieved by the retrieval means to the customer. In addition, a means for storing customer purchase information is provided to accumulate a purchase history, and a means for analyzing the purchase history is provided to determine a customer purchase profile for use in marketing particular goods.

In further accordance with the present invention, a method for automated vending of consumer products which are inventoried in a vending facility having a video means for displaying the inventoried products to a customer, input means for receiving customer information and product selections, and means for retrieving and dispersing to the customer the selected products from their inventoried location within the facility, wherein the method comprises the steps of using the video display means to prompt a customer to input customer identification information with the input means, determining a customer profile based on the input identification information, and determining whether the customer profile satisfies a first set of predetermined product promotional criteria. If the customer profile satisfies the first set of promotional criteria, a first predetermined product promotional arrangement is activated. In any event, at least one customer requested product selection menu is provided on the video display means. Then the customer's product selections are received from the input means, the selected products are retrieved from the vending facility, and the retrieved products are dispensed to the customer.

The method can further comprise the steps of determining whether at least one customer requested product selection menu satisfies a second set of predetermined product promotional criteria, and activating a second predetermined promotional arrangement if the second set of predetermined criteria are satisfied. The first and/or second set of predetermined products promotional arrangements are designed to promote designated products prior to the customer ending the vending transaction. Such arrangements can include dispensing discount savings coupons and/or free product samples to the customer prior to the selecting of products, and activating predetermined audio and/or video advertising to the customer while they are shopping. The customer profile can be based on promotional criteria such as past product purchasing history, brand loyalty, and/or other pre-stored demographic data.

The present invention will be more fully understood upon reading the following detailed description of the preferred embodiment in conjunction with the accompanying drawings.

BRIEF DESCRIPTION OF THE DRAWINGS

FIG. 3 is a diagrammatic illustration taken along line 3—3 of FIG. 1;

FIG. 5 is an illustration of an "aisle" selection menu image; and

DETAILED DESCRIPTION OF THE PREFERRED EMBODIMENT

Figure 1:
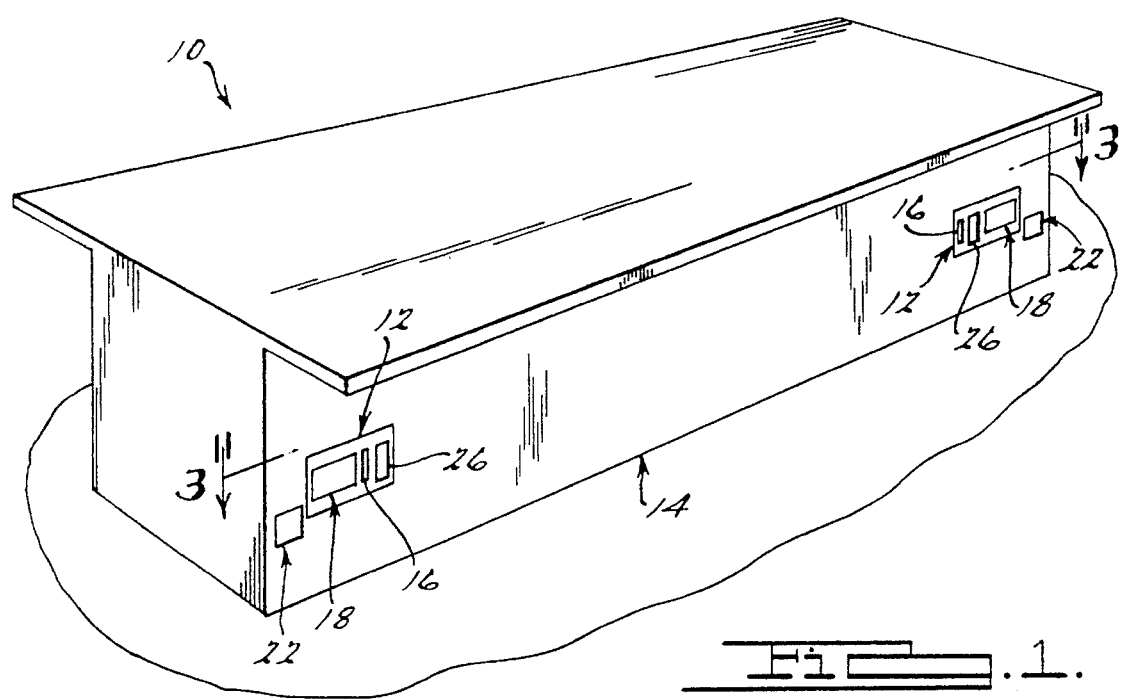
FIG. 1 is a perspective view of an automated drive-up vending structure in accordance with the present invention.

As shown in FIG. 1, the present invention comprises an automated drive-up vending facility 10 having a plurality of automatic transaction machines (ATM) 12 located around the periphery of a storage building 14. The ATM is arranged to facilitate customers driving their vehicles along side the building 14, inserting an account/debit card into a card reader 16, and making product selections via a touch screen display terminal 18. The consumer goods are stocked within the building 14, and an automated picking/sorting subsystem 20 controllably retrieves the selected products for deposit into a dispensing chute 22. As described more fully hereinbelow, selection/product information is provided at the display terminals via an interactive menu driven program. The purchase price of each selected product is automatically totaled and recorded against the customer's account.

Figure 2:
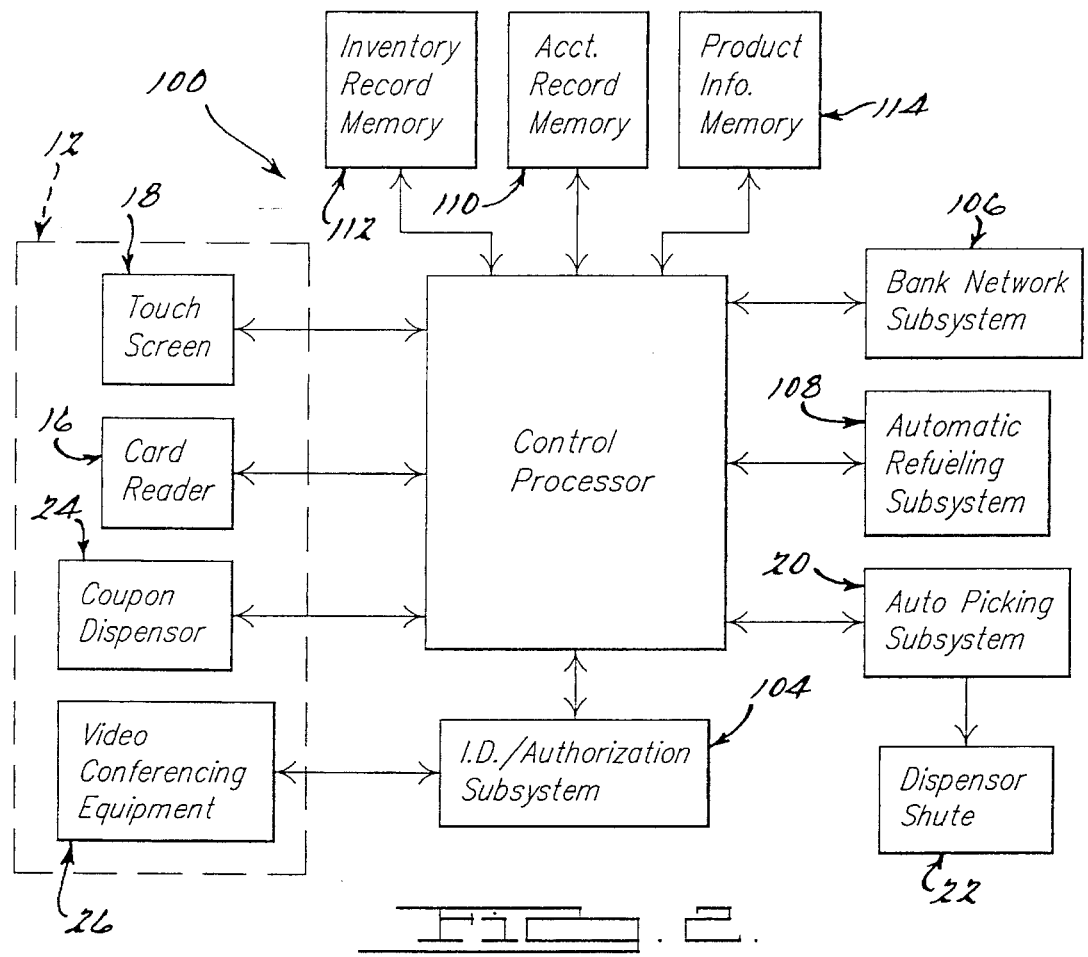
FIG. 2 is a block diagram schematic for the vending control system of the present invention.

The automated facility 10 of the present invention incorporates a vending system 100 as shown in block diagram in FIG. 2. More specifically, each ATM unit 12 includes the card reader device 16 and the touch screen input video display device 18 described above, a product discount coupon dispensing device 24, and video conferencing equipment 26.

Each ATM unit 12 is bidirectionally coupled to a control processor means 102, which is bidirectionally coupled to the automated picking/sorting subsystem 20, discount coupon dispenser 24, and a customer identification/sale authorization subsystem 104. In addition to controlling the vending system 100, the control processor 102 can provide a bidirectional transaction connection between a separate banking network subsystem 106 and/or an optional automated robotic vehicle refueling subsystem 108. One exemplary form for the optional automated robotic vehicle refueling subsystem can include a special gas tank cap/pump nozzle adaptor having a transponder means incorporated thereon. The special gas cap is used in place of the vehicle's original gas tank cap. The fueling robot can include a integrated pump nozzle robotic fuel delivery arm which interacts with the gas cap transponder means to provide automatic alignment and insertion of the pump nozzle into the nozzle adaptor portion of the gas cap.

Further, the control processor 102 performs all transaction accounting, inventory status monitoring, and record keeping. More specifically, all transactions are itemized and recorded with the particular customer's account in a memory means 110. Thus, the present invention obviates the need for cash payment at the end of a sales transaction, and provides a record of a particular customer's overall purchase history which can be tracked for use such as in targeting customers for product marketing promotions. As described more fully hereinbelow, this ability to record a customer's purchase history allows the present invention to provide dramatically enhanced product marketing opportunities over conventional vending facilities. With respect to the location of the account record memory, one of ordinary skill in the art will readily appreciate that account record memory means 110 can be located at each particular vending facility, or alternatively could be located at a remote central location, with access to each vending facility control provided by a conventional modem/telephone line connection.

The control processor 102 stores appropriate inventory status and record keeping data in a memory means 112. As a particular item is stocked, all relevant information about the item is recorded into memory 112, and as each item is purchased, the inventory record is updated. Thus, at any particular point in time, the control processor 102 has a complete record of inventory in stock within the vending facility 10. Specific information and/or product bibliographic data concerning each product is additionally stored in a memory means 114.

In further accordance with present invention, the control processor 102 is able to use the inventory record memory 112 as a means for automatically tracking and removing dated and/or perishable goods from the inventory by knowing precisely when the particular expiration dates will occur. Further, the control processor can control selection/dispensing of the oldest goods in stock in response to a customer's purchase order for the particular good.

As shown in FIG. 3, the automated picking/sorting subsystem 20 generally comprises a plurality of specialized product storage units 202 positioned within building 14 about a longitudinally extending, bidirectional conveyor mechanism 204. Each of the product storage units 202 is designed to store and discharge upon command a particular type of good, such as bottles, cans, pharmaceutical goods, etc. Each storage unit 202 is provided with an associated product discharge mechanism 206 which effectively transports a selected product from the storage unit 202 to the bidirectional conveyor mechanism 204. A pair of bidirectional dispensing conveyor mechanisms 208 and 210 are each located at a respective end of the bidirectional conveyor 204. The dispensing conveyor mechanisms 208 and 210 are arranged and positioned relative to conveyor mechanism 204 such that the dispensing conveyor mechanisms controllably redirect the travel of any goods reaching the ends of conveyor mechanism 204 to the appropriate dispensing chute 22. Overall operation of the picking/sorting subsystem 20 is controlled by processor 102.

Figure 4:
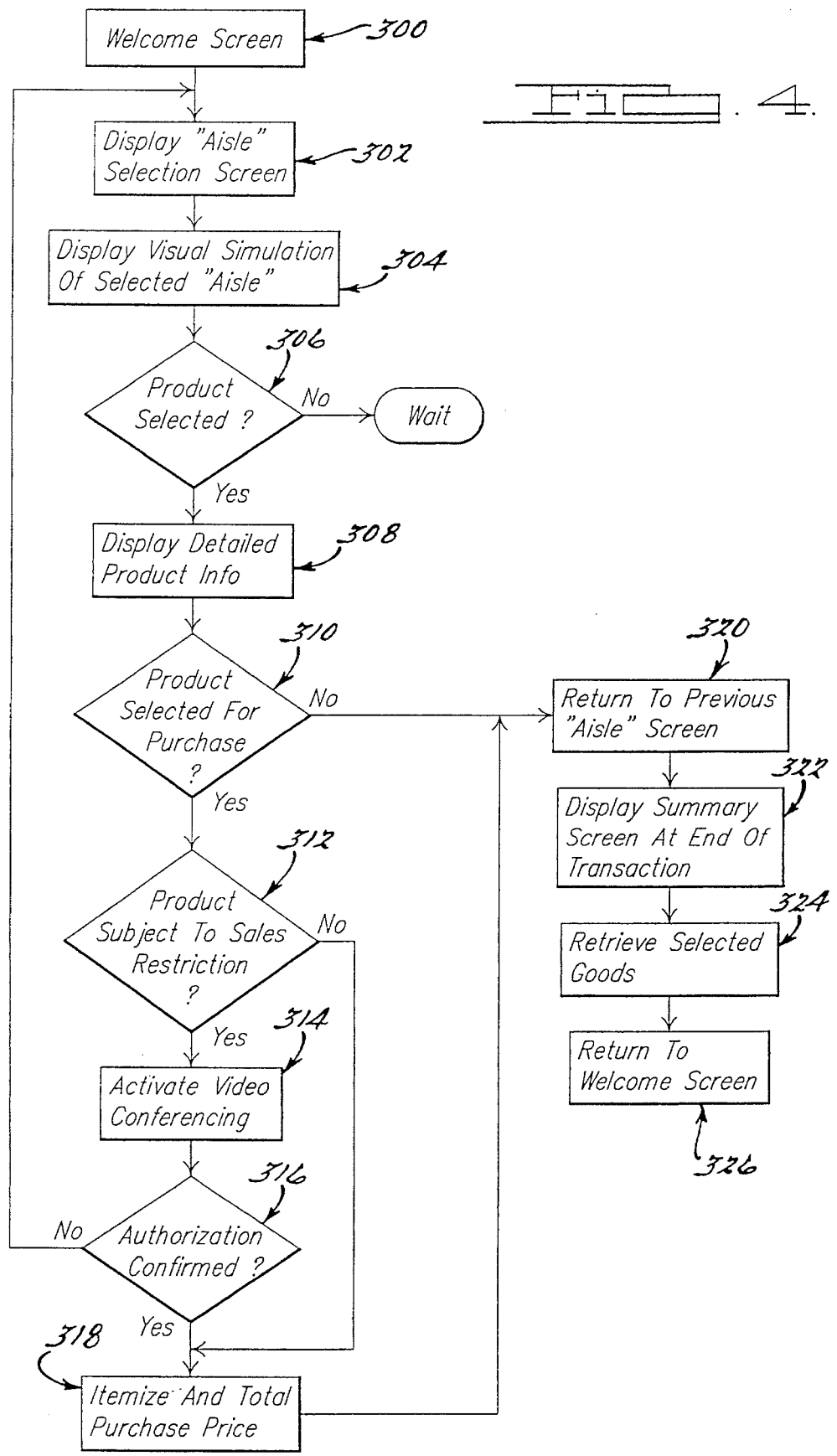
FIG. 4 is a flow chart illustrating operation of the interactive customer ordering method.

Referring now to FIG. 4, operation of the interactive menu driven customer input program initially provides a combination "welcome" screen and card insertion prompt on video display device 18 at step 300. Upon appropriate insertion of an account/debit card into card reader 16, an "aisle" selection screen is displayed on the touch screen at step 302. The "aisle" selection screen provides a classification of consumer goods according to type. An example of such a screen image is illustrated in FIG. 5. Selecting an "aisle" allows a customer to simulate conventional shopping by permitting video browsing down an "aisle" of consumer goods.

Thus, in response to a customer's touch selection of a particular "aisle," an input screen is displayed at step 304 which visually simulates actual products as they might appear in a conventional shelving arrangement. A customer can scan through video images as though browsing up and down an aisle, or move to a new aisle. If the customer touches the image of a particular good displayed on the "aisle" screen at step 306, detailed bibliographic information regarding the chosen product is displayed at step 308. If the customer chooses to purchase the product, an appropriate video icon is touched on the screen 18. If purchasing of a product is detected at step 310, processor 102 determines whether a restricted good, such as alcohol or tobacco, has been selected at step 312. If a restricted good has not been selected, the number of goods purchased is tallied and the amount is totaled at step 318. If the product is not selected for purchase, the customer is returned to the previous "aisle" screen at step 320.

If purchase of a restricted good is detected at step 312, the processor 102 automatically activates the identification/authorization subsystem 104, which subsequently activates the video conferencing equipment 26 at step 314. Activation of video conferencing equipment 26 places the customer in direct communication with a sales attendant (who can be located on-site or at a remote location), where the customer is asked to provide purchase authorization information such as by flashing a valid Identification to the attendant, or inputting a valid password. If authorization is confirmed at step 316, the attendant directs the system by way of a remotely activated switch to go to step 318. If authorization is confirmed, the attendant returns the system to step 302. It is worth noting that in addition to the automatic activation at step 314, video conferencing equipment 26 can be customer activated at the ATM 12 at any time during the transaction if the customer desires assistance or information from an attendant.

Figure 6:
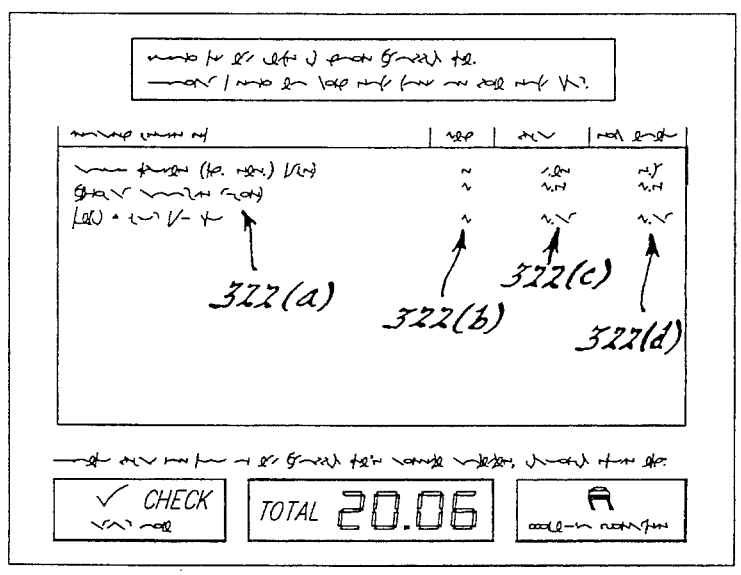
FIG. 6 is an illustration of a transaction summary checkout menu image.
Figure 7:
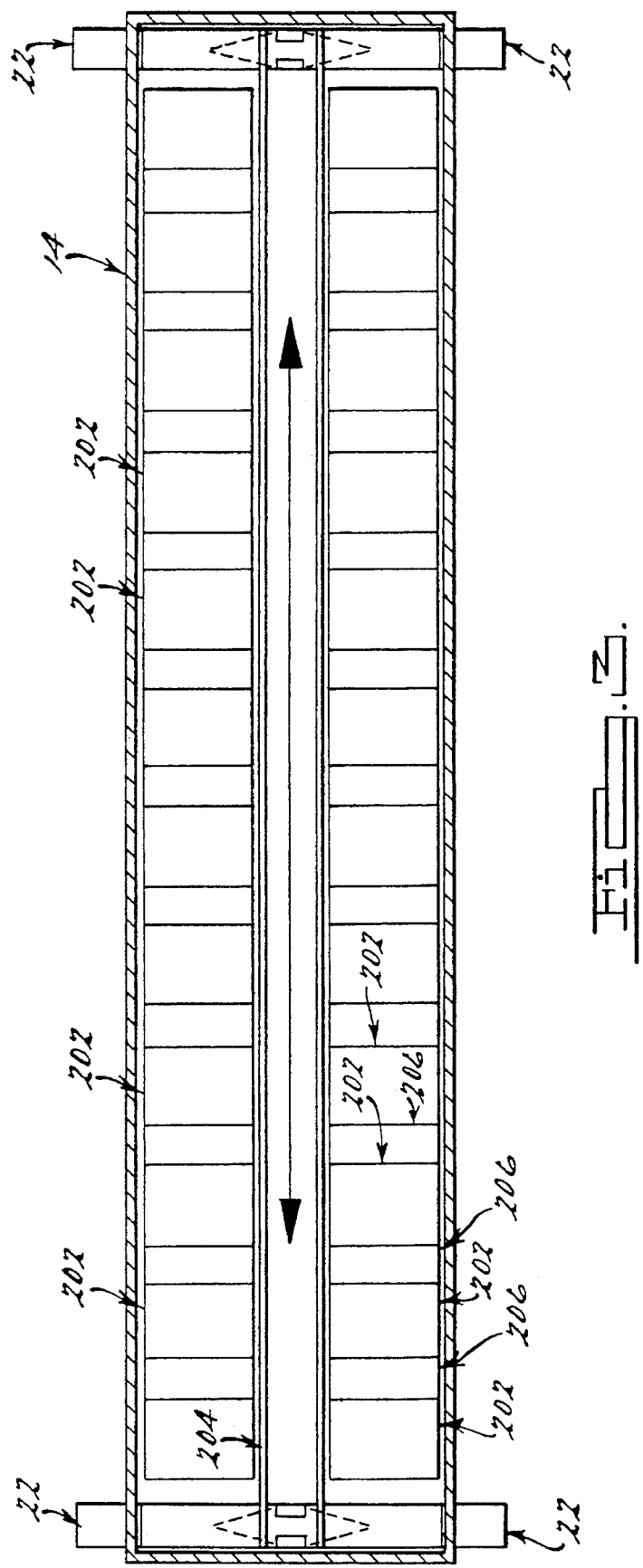

After the customer has finished shopping and all the desired goods have been selected, the customer touches a check-out video icon which causes display of a transaction summary screen at step 322. The transaction summary screen provides an itemized listing of all goods selected and the total transaction price. An example of a transaction summary image is illustrated in FIG. 6 wherein product type is listed at 322(a), number of units selected at 322(b), unit price at 322(c), and total price at 322(d). The customer is provided with an option to "put back" items before check-out is finalized. Upon finalizing of the transaction, the selected goods are retrieved at step 324 as described hereinabove. The system then returns to, the "welcome" screen at step 326.

Thus, the present invention provides an automated method and system for drive-up vending of consumer products which advantageously improves ease and flexibility of the interactive customer selection program, while integrating inventory and customer purchase history tracking into the overall vending control system. Tracking of a customer's past purchasing history (such as for frequency of product purchase or brand loyalty) allows the present invention to accurately target selected customers for improved strategic product promotional plans, such as dispensing discount savings coupons through coupon dispensing device 24 and/or displaying video advertising on screen 18, prior to the targeted customer actually purchasing any goods. The enhanced customer targeting feature of the present invention provides an ability to influence customers just prior to their purchase. In addition to the tracking of a customer's purchase history, the automated vending arrangement of the present invention provides other enhanced marketing capabilities which can influence a customer's purchase decisions just prior to selection or check out. For example, since the processor 102 knows which video aisle a customer may be browsing, preprogrammed company and/or product jingles can be matched with particular aisles and subsequently played over an audio system as a customer browses in the aisle. Further, a customer's personal data can be stored with the account number to provide a demographic profile which permits particular segments of the shopping population to be selectively targeted for coupon and/or promotional sample dispensing. Also, since only video facsimiles of the products are displayed in an "aisle" format, the present invention easily allows highlighted or discounted products to be displayed in specially designated promotional aisles without physically moving any of the products as would be required in a conventional vending facility.

Finally, it is also worth noting that in addition to enhanced marketing capabilities and other benefits of the automated vending operation of the present invention, the physical layout of vending facility 10 provides advantages over conventional vending facilities. For example, the overall compactness of the self-contained vending facility 10 allows the present system to be mobile. This also allows the system to be wholly constructed off-site, and then when a location is selected for business, the building can simply be transported to the site and placed upon a suitable foundation.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. An automated drive-up vending system comprising:
   a storage facility for housing a plurality of saleable goods, wherein the sale of at least some of said plurality of saleable goods may be subject to particular restrictions;
   at least one customer input means positioned outside of said storage facility, said at least one customer input means being accessible to an occupant of a vehicle when the vehicle is positioned adjacent to said at least one input means;
   an automated goods retrieval means located within said storage facility which is responsive to said at least one customer input means for retrieving any goods which are selected by a customer;
   a goods dispensing means for delivering to the customer the goods retrieved by said retrieval means; and
   a purchase authorization means comprising:
      means for detecting customer selection of a good subject to a sales restriction;
      means responsive to said detection means for automatically providing direct communication between the customer and an authorization attendant;
      means for communicating customer identification information to the authorization attendant; and
      means remotely operated by the authorization attendant for enabling completion of the restricted goods sales transaction upon attendant verification of acceptable customer identification information.

2. The system of claim 1 further comprising means for storing inventory information and a means for updating said inventory information in response to goods selected and dispensed to the customer.

3. The system of claim 2 further comprising means for tracking said inventory information for automatically detecting and removing any perishable goods which have passed their expiration dates.

4. The system of claim 1 further comprising means for storing customer purchase information to accumulate a purchase history.

5. The system of claim 4 further comprising means for analyzing said purchase history to determine a customer purchase profile for use in marketing particular goods.

6. The system of claim 1 wherein said storage facility comprises a mobile structure suitable for off-site construction.

7. The system of claim 1 wherein said at least one customer input means comprises a touch video input screen.

8. The system of claim 7 further comprising means for generating at least one selection menu image on said touch video input screen for facilitating selection of goods by the customer.

9. The system of claim 1 further comprising means for reading a customer account identification card, and means for automatically debiting the customer's vending transaction at the end of a transaction.

10. An automated drive-up vending system comprising:
    a storage facility for housing a plurality of saleable goods, wherein the sale of at least some of said plurality of saleable goods may be subject to particular restrictions;
    at least one customer input means positioned outside of said storage facility, said at least one customer input means being accessible to an occupant of a vehicle when the vehicle is positioned adjacent to said at least one input means;
    an automated goods retrieval means located within said storage facility which is responsive to said at least one customer input means for retrieving any goods which are selected by a customer;
    a goods dispensing means for delivering to the customer the goods retrieved by said retrieval means;
    means for storing customer purchase information to accumulate a purchase history; and
    means for analyzing said purchase history to determine a customer purchase profile for use in marketing particular goods.

11. The system of claim 10 further comprising a purchase authorization means comprising:
    means for detecting customer selection of a good subject to a sales restriction;
    means responsive to said detection means for automatically providing direct communication between the customer and an authorization attendant;
    means for communicating customer identification information to the authorization attendant; and
    means remotely operated by the authorization attendant for enabling completion of the restricted goods sales transaction upon attendant verification of acceptable customer identification information.

12. The system of claim 10 further comprising means for storing inventory information and a means for updating said inventory information in response to goods selected and dispensed to the customer.

13. The system of claim 12 further comprising means for tracking said inventory information for automatically detecting and removing any perishable goods which have passed their expiration dates.

14. The system of claim 10 wherein said storage facility comprises a mobile structure suitable for off-site construction.

15. The system of claim 10 wherein said at least one customer input means comprises a touch video input screen.

16. The system of claim 15 further comprising means for generating at least one selection menu image on said touch video input screen for facilitating selection of goods by the customer.

17. The system of claim 10 further comprising means for reading a customer account identification card, and means for automatically debiting the customer's vending transaction at the end of the a transaction.

18. A method for automated vending of consumer products, said consumer products being inventoried in a vending facility having a video means for displaying the inventoried products to a customer, input means for receiving customer information and product selections, and means for retrieving and dispensing to the customer the selected products from their inventoried location within the facility, said method comprising the steps of:

using said video means to prompt a customer to input customer identification information with said input means;

determining a customer profile based on said input identification information;

determining whether said customer profile satisfies a first set of predetermined product promotional criteria;

activating a first predetermined product promotional arrangement if said customer profile satisfies said first predetermined promotional criteria;

providing at least one customer requested product selection menu on said video display means;

receiving the customer's product selections from said input;

retrieving the selected products from the vending facility; and dispensing said retrieved products to the customer.

19. The method of claim 18 further comprising the steps of determining whether the at least one customer requested product selection menu satisfies a second set of predetermined product promotional criteria; and activating a second predetermined promotional arrangement if said second set of predetermined criteria are satisfied.

20. The method of claim 19 wherein said first and second predetermined product promotional arrangements comprise promoting designated products prior to the customer ending the vending transaction.

* * * * *